United States Patent [19]
Schmidt et al.

[11] 3,733,925
[45] May 22, 1973

[54] THREAD CUTTING DEVICE FOR SLIDE LATHES

[76] Inventors: Reinar Schmidt; Erik Schmidt, both of Skyttegatan 5-7, S-771 01 Ludvika, Sweden

[22] Filed: Apr. 29, 1971

[21] Appl. No.: 138,573

[30] Foreign Application Priority Data

May 6, 1970  Sweden ............................... 6237/70

[52] U.S. Cl. ................................................ 82/24 A
[51] Int. Cl. ............................................. B23b 21/00
[58] Field of Search ...................... 82/24 R, 24 A, 5

[56] References Cited

UNITED STATES PATENTS

| | | | |
|---|---|---|---|
| 2,338,951 | 1/1944 | Malagrino | 82/24 A |
| 2,330,156 | 9/1943 | Stoen | 82/24 A |

*Primary Examiner*—Leonidas Vlachos
*Attorney*—Birch, Swindler, McKie & Beckett

[57] ABSTRACT

A thread cutting device for a slide lathe comprising a tool holder support member constructed of a guide member and a slide member reciprocatingly slidable with respect to each other and mounted at a predetermined oblique angle with respect to the axis of rotation of the lathe spindle whereby the members move in a straight line movement at the oblique angle. SPring biased latch means normally lock the guide and slide members against relative movement when the tool is in a work cutting position. Stop means are connected to the support member to release the latch means to permit the guide and slide members to move relative to each other to cause the cutting tool to move out of engagement with a workpiece and stop continued feed of the tool at a position where the cutting operation is to be terminated.

7 Claims, 5 Drawing Figures

THREAD CUTTING DEVICE FOR SLIDE LATHES

BACKGROUND OF THE INVENTION

1. Field of the Invention

This invention relates generally to a thread cutting device for slide lathes and, more particularly, to such a device in which the tool holder is retained securely in a working position during the thread cutting operation but is released for movement away from the workpiece at the completion of the thread cutting operation.

2. Description of the Prior Art

It is known in thread cutting devices to arrange for the tool holder to yield in a number of directions and to be retained in its working position by a number of snap means. Such a construction is relatively complicated and has the disadvantage that play or involuntary yielding of the holder is liable to appear or occur when resistance to cutting is high, which results in impaired accuracy and a higher reject percentage.

SUMMARY OF THE INVENTION

Among the objects of the present invention is to avoid the disadvantages of prior art thread cutting devices and to provide a simpler and more reliable thread cutting device for slide lathes in which the tool holder is retained stably in working position during the thread cutting operation but is released for movement away from the workpiece at an oblique angle by stop means at the completion of the cutting operation.

According to the present invention there is provided a thread cutting device for a slide lathe having a cutting tool and tool post attachment means which comprises a tool holder and a support member therefor mounted on the tool post attachment means. The tool holder support member comprises a guide member and a slide member reciprocatingly slidable relative to each other in a straight line movement to move the tool into and out of work engagement position. The slide and guide members are inclined at a predetermined oblique angle with respect to the axis of rotation of the lathe spindle whereby the straight line movement occurs at the oblique angle. Spring biased latch means are provided for locking the guide and slide members against relative movement when the tool is in work cutting position. Stop means are mounted on the lathe and connected to the support member to release the latch means to permit the guide and slide members to move relative to each other at an oblique angle to cause the tool to move out of engagement with the work piece and thereby stop continued feed of the tool at a position where the cutting operation is to be terminated. The stop means comprises a slidable connecting rod having a stop member mounted thereon and a link connecting the rod to the slide member whereby the link releases the latch means when the rod is pulled to a position where the stop member is engaged.

BRIEF DESCRIPTION OF THE DRAWINGS

Other objects and advantages of the invention will become apparent by reference to the detailed description of the invention and the accompanying drawings which follow wherein.

DETAILED DESCRIPTION OF THE INVENTION

Figure 1:
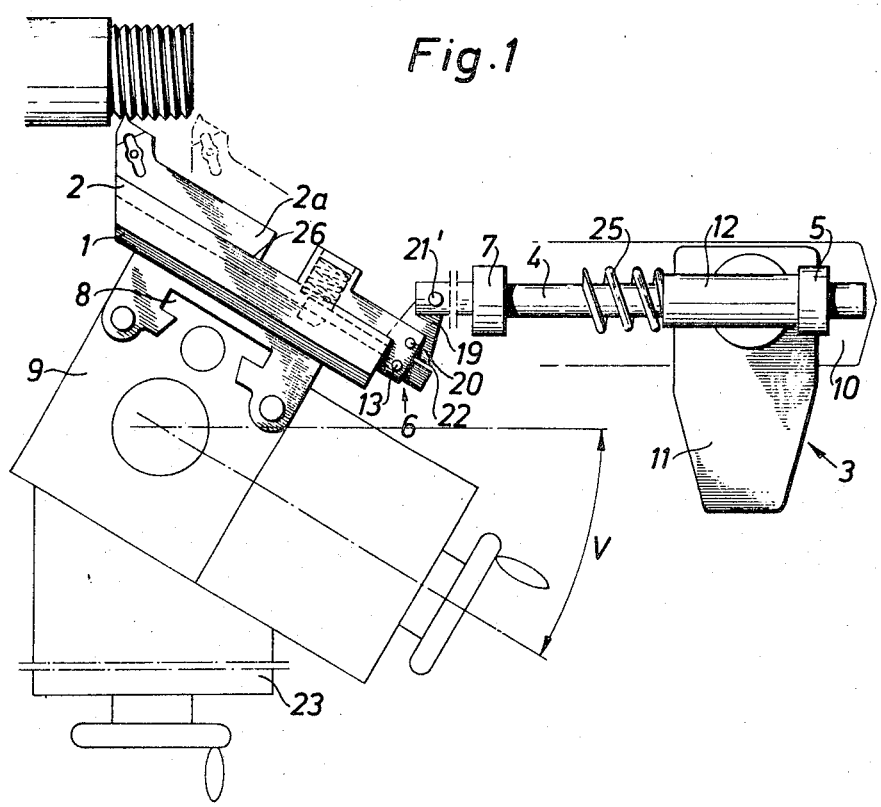
FIG. 1 is a plan view illustrating how the thread cutting device is arranged in a lathe for cutting an external thread, the different components being shown in those positions taken by the components when the stop means first comes into operation.

The principal parts of the thread cutting device are a guide structure or member 1, which can be mounted on the lathe, a slide 2, which is carried by the guide structure, a tool holder 2a or 2b, which is carried by the slide, a stop means 3, which can be attached to the lathe bed, a connecting rod 4 with a stop ring 5 for arresting tool feed movement, a latch means 6 for latching the slide in the guide structure and a return ring 7 located on the rod.

As will be seen from FIGS. 1–4, the guide structure 1 is arranged to be mounted in the tool post attachment means 8 on the compound slide 9 of the lathe. The slide 2 can effect a rectilinear sliding movement on the guide structure 1 and forms together therewith a support member 1, 2 for a tool holder 2a or 2b.

Figure 2:
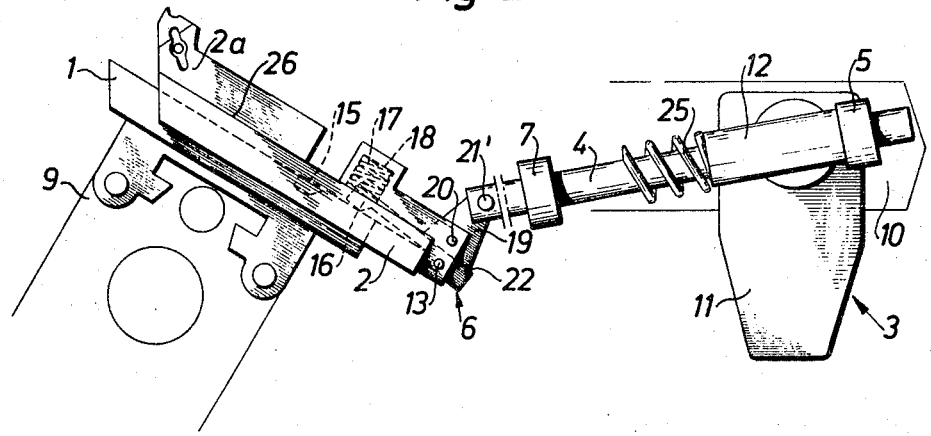
FIG. 2 is a similar plan view illustrating the same thread cutting device with the different components being shown in the position taken by the components after continued axial advancement through a short distance subsequent to the stop means coming into operation.

As shown in FIGS. 1 and 2, the stop means 3 is attached to the lathe bed 10 and has a stop sleeve 12 which is pivotally carried by an attachment and support element 11 and in which the connecting rod 4 is axially slidably journalled. One end of the rod 4 is linked together with the slide 2 in the tool holder support member 1, 2, while its other end projects out on the opposite side of the stop sleeve 12 and is provided with a stop ring 5 which can be fixed in a desired axial position along the rod.

Figure 3:
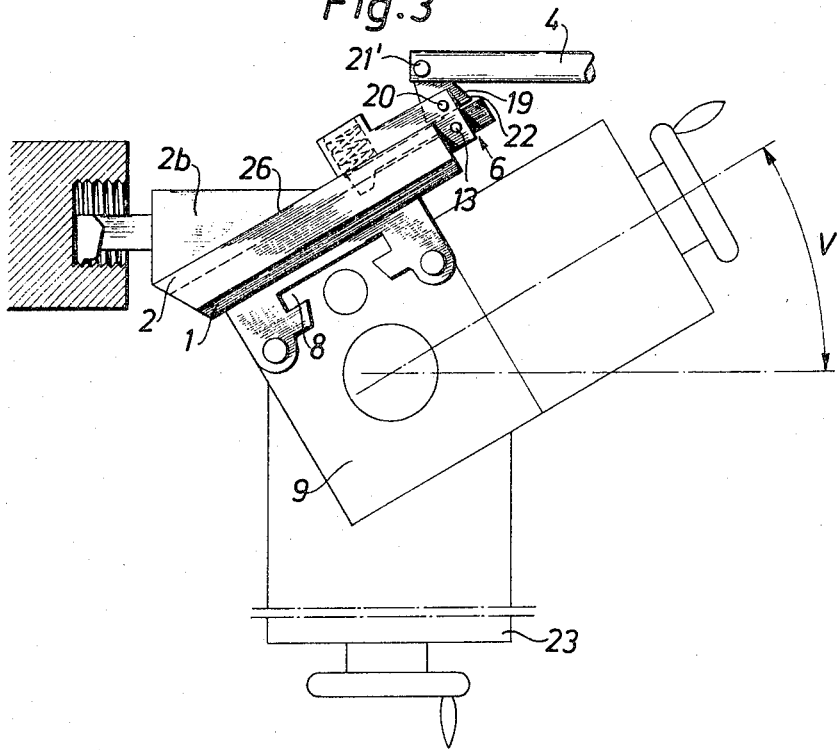
FIG. 3 is a plan view of substantially the same thread cutting device as that illustrated in FIG. 1, although in this case adapted to cut an internal thread.
Figure 5:
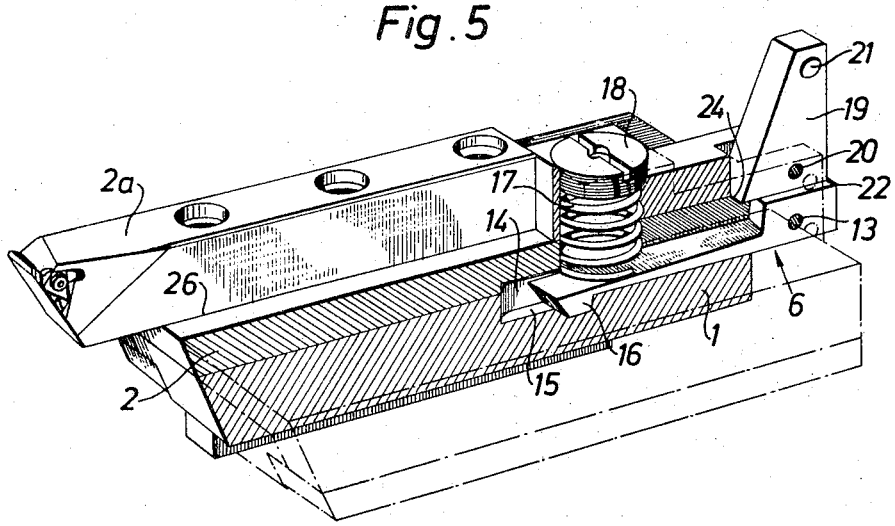
FIG. 5 is a perspective view of the support member and the tool post or holder arranged thereon, a central section having been placed along the support member to show the arrangement of a latching mechanism in the support member more clearly than in the preceding figures.

In a predetermined position between the slide 2 and the guide structure 1 as shown in FIGS. 1 and 3, the slide is prevented by the latch means 6 from sliding on the guide structure when the latch is in engagement. The latch consists of a double lever which is pivotally mounted about a pin 13 mounted in the slide 2. As will best be seen from FIG. 5, the arms of the latch are oriented in the direction of the movement path of the slide on the guide structure, a major portion of the front arm being accomodated in recesses 14 in the slide and the guide structure. A front portion of the recess located in the guide structure forms a latch opening 15 for a pawl 16 arranged on the front arm. A pressure spring 17 is embodied in the slide 2 with one end abutting the front arm of the latch 6 to hold the pawl 16 in engagement with the latch opening 15. The spring is arranged in a cylindrical hole and its end remote from the latch means is engagably actuated by an adjuster screw 18 arranged in the upper end of the hole.

The rear arm of the latch 6 is arranged to be actuated to lift the pawl 16 from the latch hole 15 by means of a link 19 pivotally mounted about pin 20, which is parallel with the pivot pin 13 for the latching means 6 and which is arranged on the slide 2. The link 19 is provided with a hole 21 for a further pin 21', which forms a pivotable attachment for the front end of the connecting rod 4. The link 19 is provided with an edge surface 22 which is located at a suitable lever arm distance from its pivot center in the pin 20 and which — when the link 19 is tilted as a result of pull on the rod 4 — is forced against the rear arm on the latch means 6, whereby the pawl 16 is lifted out of the latch hole 15 against the action of the spring 17 so that the mutual locking of the slide 2 and the guide structure 1 is broken and the slide can move along the guide structure.

The cutting tool, the tool holder 2a or 2b and the tool holder support member 1, 2 are adapted to carry out the thread cutting work with the path of movement of the slide 2 on the guide structure 1 positioned obliquely to the axis of rotation of the lathe spindle. The angle of inclination v should lie within the range of from 10° to 65° in order to obtain a good result, and is suitably selected to advantage as about 30°. The oblique setting of the path of slide movement is made when setting up the tool, by adjusting the compound slide of the lathe to the desired angle. Orientation of the support means 1, 2 depends on whether an internal or an external thread is to be cut and is naturally selected so that the slide 2 is removed from the working position of the workpiece upon movement in the guide structure 1 as a result of the influence of the stop means 3.

The mode of operation of the thread cutting device according to the invention is clearly evident from FIGS. 1 and 2. The cutting bit of the tool holder 2a can be freely advanced from the right hand starting position marked with broken lines in FIG. 1 to the left hand position marked with full lines in the same Figure, at which latter position the machining operation is interrupted. During this feeding movement of the cutting bit and tool holder, the rod 4 has slid through a corresponding distance from right to left, but is prevented from continuing by reason of the fact that its stop ring 5 in the illustrated position has engaged the stop sleeve 12. As will be seen from FIG. 2, upon continued movement of the cross slide 23 and the compound slide 9 to the left only the guide structure 1 is caused to accompany the movement, while the engagement of the stop ring 5 with the stop sleeve 12 causes the rod 4 to be pulled, which thereby tips the link rearwardly around the pin 20 in a manner whereby the edge surface 22 of the link actuates the latch means 6 to swing said means around the pin 13 and break the locking engagement between the pawl 16 and the latch opening 15. The slide 2 is therewith capable of being moved on the guide structure 1 and is prevented by its attachment in the lathe bed, via the stop sleeve 12, from accompanying the continued feeding movement of the guide structure. When moving rearwardly, as seen from the guide structure, the slide 2 is forced to move outwardly from the lathe spindle as a result of the aforementioned inclined path of slide movement, whereby the tool is moved out of cutting engagement with the workpiece.

Upon return movement of the cross slide 23 to the right, the return ring 7 on the connecting rod 4 forces the slide 2 back to the predetermined working position relative the guide structure 1, the latch means 6 returning to latching position with the pawl 16 engaging in the latch opening 15. This return of the pawl 16 into engagement with the opening 15, i.e., the actual swinging of the latch means around the pin 13, is effected exclusively by the action of the spring 17. When the cross slide is returned, an edge surface 24 opposite the edge surface 22 (FIG. 5) on the link 19 is forced against a fixed abutment surface on the slide 2, thus not against the latch means 6. Engagement of the return ring 7 against the stop sleeve 12 is cushioned by a spring 25.

Figure 4:
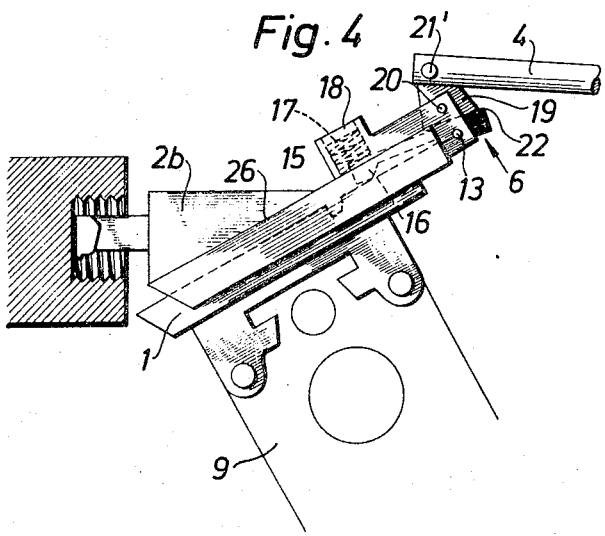
FIG. 4 is a plan view of the thread cutting device of FIG. 3 corresponding to FIG. 2 with regard to the positions of the different components.

The mode of operation for the embodiment illustrated in FIGS. 3 and 4 for cutting an internal thread coincides fully with the previously described mode of operation, except for the fact that the compound slide is inclined at an angle v° in the opposite direction, so that when the stop ring 5 comes into operation the tool on the slide 3 passes out of cutting engagement with the workpiece, by being moved inwardly toward the center axis of the lathe spindle.

The tool holder 2a (FIGS. 1, 2 and 5) or 2b (FIGS. 3 and 4) has an abutment surface 26 against the slide 2, so positioned in relation to the cutting bit that a straight working profile is obtained with a predetermined oblique setting of the tool holder support member 1, 2. This construction provides the most stable and least space-requiring tool attachment. As shown in FIGS. 3 and 4, the tool holder may be constructed of several parts.

The thread cutting device of the present invention is simple and very reliable. The solution obtained with solely a rectilinear sliding movement for the slid in the guide structure affords the possibility of a particularly robust construction, and with the latch means which is only released by direct activation from the stop means, insures that the tool is effectively retained during the working operation, thereby eliminating the risk of play and unintentional yielding of the tool.

The thread cutting apparatus is also very easy to set us and to use. When setting up the device, the support member 1, 2 with the tool holder is mounted in the tool post attachment means 8 of the lathe, the cutting bit is set to the position where the thread is to finish and the stop ring 5 is tightened into firm abutment with the stop sleeve 12, whereafter the cutting bit is set to the point where the thread is to commence and the return ring 7 is tightened firmly against the spring 25. When using the device of the invention, the cross slide is set for a first cutting operation, the cutting operation being carried out until the cutting bit leaves the workpiece, whereafter the lathe is reversed and the cross slide set for the next cutting operation, this operation being continued as soon as the starting position has been reached, this latter sequence can then be repeated as required.

The invention is not restricted to the described and illustrated embodiment but includes any modifications and equivalents within the scope of the appended claims.

We claim:

1. In a thread cutting device for a slide lathe having a cutting tool and tool post attachment means, the improvement which comprises;
a tool holder;
a tool holder support member mounted on said tool post attachment means, said support member comprising a guide member and a slide member reciprocatingly slidable relative to each other in a straight line movement to move said tool into and out of a work engaging position, and said slide and guide members being inclined at a predetermined oblique angle with respect to the axis of rotation of the lathe spindle whereby said straight line movement occurs at said oblique angle;

spring biased latch means for locking said guide and slide members against relative movement when said tool is in work cutting position; and stop means mounted on said lathe and connected to said support member to release said latch means to permit said guide and slide members to move relative to each other to cause said tool to move out of engagement with a workpiece and thereby stop continued feed to said tool at a position where the cutting operation is to be terminated, said stop means comprising a slidable connecting rod having a stop member mounted thereon and a link connecting said rod to said slide member whereby said link releases said latch means when said rod is pulled to position where said stop member is engaged.

2. A thread cutting device according to claim 1 wherein said guide and slide members are obliquely inclined at an angle of from 10 degrees to 65 degrees.

3. A thread cutting device according to claim 1 wherein said guide and slide members are obliquely inclined at an angle of approximately 30 degrees.

4. A thread cutting device according to claim 1 wherein said latch means comprises a spring biased lever arm pivotally mounted on said slide member and having a pawl adapted to normally engage a recess in said guide member.

5. A thread cutting device according to claim 1 wherein a return member is mounted on said rod and is urged against a spring to cause said rod to move said slide member back to a predetermined working position relative to said guide member following completion of a cutting operation.

6. A thread cutting device according to claim 1 wherein said latch means comprises a spring biased double lever arm pivotally mounted on said slide member and having a pawl on one arm adapted to normally engage a recess in said guide member to lock said guide and slide members against relative movement, the other arm of said double lever arm being positioned to be actuated by said link to release said pawl from said recess upon movement of said rod to a position where said stop member is engaged.

7. A thread cutting device according to claim 6 wherein said link has an abutment surface which engages a load absorbing surface on said slide member to relieve said latch means from link actuation when said rod applies pressure to said link.

* * * * *